US009645943B2

United States Patent
Kopylovitz et al.

(10) Patent No.: US 9,645,943 B2
(45) Date of Patent: May 9, 2017

(54) STORAGE ARRANGEMENT AND METHOD USING A PLURALITY OF STORAGE SPACES WHICH HAVE SEPARATE CONTROL LAYERS AND SEPARATE MAPPING STRUCTURES

(75) Inventors: Haim Kopylovitz, Herzliya (IL); Leo Corry, Ramat Gan (IL); Yechiel Yochai, Moshav Aviel (IL)

(73) Assignee: INFINIDAT LTD., Herzliya (IL)

( * ) Notice: Subject to any disclaimer, the term of this patent is extended or adjusted under 35 U.S.C. 154(b) by 114 days.

(21) Appl. No.: 14/000,889

(22) PCT Filed: Feb. 22, 2012

(86) PCT No.: PCT/IL2012/050056
§ 371 (c)(1),
(2), (4) Date: Aug. 22, 2013

(87) PCT Pub. No.: WO2012/114338
PCT Pub. Date: Aug. 30, 2012

(65) Prior Publication Data
US 2013/0332700 A1    Dec. 12, 2013

Related U.S. Application Data

(60) Provisional application No. 61/445,078, filed on Feb. 22, 2011.

(51) Int. Cl.
*G06F 12/00* (2006.01)
*G06F 12/109* (2016.01)
*G06F 3/06* (2006.01)

(52) U.S. Cl.
CPC .......... *G06F 12/109* (2013.01); *G06F 3/0604* (2013.01); *G06F 3/067* (2013.01);
(Continued)

(58) Field of Classification Search
CPC ...... G06F 3/061; G06F 3/0628; G06F 3/0631; G06F 3/0662; G06F 3/0683;
(Continued)

(56) References Cited

U.S. PATENT DOCUMENTS 7,124,275 B2    10/2006  Gammel
7,236,987 B1 *  6/2007   Faulkner et al.
(Continued)

FOREIGN PATENT DOCUMENTS

| WO | WO03062979 | 7/2003 |
| WO | WO2006/045847 | 5/2006 |
| WO | WO2010092576 | 8/2010 |

*Primary Examiner* — Reba I Elmore
(74) *Attorney, Agent, or Firm* — Reches Patents (57) ABSTRACT

There is provided a storage arrangement and a method of operating thereof. The storage arrangement comprises a first storage system and one or more second storage systems operatively coupled to the first storage system. First control layer is operable to handle a first logical address space comprising a first logical group characterized by a plurality of logical block addresses; first control layer comprises a first mapping module handling a first mapping structure associated with first logical group. Each second control layer comprises, respectively, a second mapping module handling a second mapping structure associated with first logical group. The first mapping structure is configured to provide mapping between logical addresses related to first logical group and corresponding addresses related to first physical address spaces, and/or to point to respective second mapping structure configured to provide mapping between these logical addresses and corresponding addresses related to respective second physical address spaces.

15 Claims, 3 Drawing Sheets

(52) U.S. Cl.
CPC .......... *G06F 3/0644* (2013.01); *G06F 3/0664* (2013.01); *G06F 3/0665* (2013.01)

(58) Field of Classification Search
CPC ............... G06F 12/0223; G06F 12/063; G06F 12/0692; G06F 12/1036; G06F 12/1081; G06F 13/4221; G06F 13/4234
USPC .......... 711/209, 214, 218; 710/7, 12, 26, 34, 710/36, 53; 709/218, 225, 232
See application file for complete search history.

(56) References Cited

U.S. PATENT DOCUMENTS

| | | |
|---|---|---|
| 7,636,764 B1 | 12/2009 | Fein |
| 2003/0051021 A1* | 3/2003 | Hirschfeld et al. ............ 709/223 |
| 2003/0135783 A1* | 7/2003 | Martin ................ G06F 11/1471 714/13 |
| 2004/0230787 A1* | 11/2004 | Blumenau et al. ................ 713/1 |
| 2005/0015378 A1 | 1/2005 | Gammel et al. |
| 2008/0276036 A1* | 11/2008 | Van Acht ............ G06F 12/0246 711/103 |
| 2009/0006746 A1* | 1/2009 | Sharma ................ G06F 3/0617 711/114 |
| 2010/0153975 A1* | 6/2010 | Zwisler et al. ................ 719/326 |
| 2010/0199042 A1* | 8/2010 | Bates .................... H04L 67/289 711/114 |
| 2010/0274982 A1* | 10/2010 | Mehr .................. G06F 11/1458 711/162 |
| 2010/0306174 A1 | 12/2010 | Otani |
| 2011/0082997 A1* | 4/2011 | Yochai .................. G06F 3/0605 711/171 |
| 2012/0023282 A1* | 1/2012 | Rub .................... G06F 12/0246 711/103 |
| 2012/0143823 A1* | 6/2012 | Jain .................. G06F 17/30584 707/640 |
| 2012/0173813 A1* | 7/2012 | Mizuta et al. ................. 711/114 |

\* cited by examiner

STORAGE ARRANGEMENT AND METHOD USING A PLURALITY OF STORAGE SPACES WHICH HAVE SEPARATE CONTROL LAYERS AND SEPARATE MAPPING STRUCTURES

FIELD

The present invention relates, in general, to data storage systems and respective methods for data storage, and, more particularly, to cloud storage arrangements and methods of operating thereof.

BACKGROUND

Cloud computing and cloud storage are techniques that have become increasingly common in the industry. Cloud storage is a model of networked online storage where data is stored on multiple virtualized storage systems rather than being hosted on dedicated systems. Optionally, physical and/or virtual storage resources (or parts thereof) can be hosted by third parties.

Physical storage resources can span across multiple systems, while cloud storage enables presenting to a user a logical space for data storage and itself handles the process of mapping the logical space to the actual physical location.

Problems of cloud storage have been recognized in the contemporary art and various systems have been developed to provide a solution, for example:

US Patent Application No. 2010/199042 (Bates et al.) discloses a multi-cloud data replication method which includes providing a data replication cluster comprising at least a first host node and at least a first online storage cloud. The first host node is connected to the first online storage cloud via a network and comprises a server, a cloud array application and a local cache. The local cache comprises a buffer and a first storage volume comprising data cached in one or more buffer blocks of the local cache's buffer. The method further comprises requesting authorization to perform cache flush of the cached first storage volume data to the first online storage cloud; upon receiving approval of the authorization, encrypting the cached first storage volume data in each of the one or more buffer blocks with a data private key; assigning metadata comprising at lest a unique identifier to each of the one or more buffer blocks and then encrypting the metadata with a metadata private key; transmitting the one or more buffer blocks with the encrypted first storage volume data to the first online cloud storage; creating a sequence of updates of the metadata, encrypting the sequence with the metadata private key and then transmitting the sequence of metadata updates to the first online storage cloud.

US Patent Application No. 2010/306174 (Otani) discloses methods and apparatuses for block-based storage subsystem with backup ability to a file-based storage service such as HTTP or cloud storage service. In one embodiment, a storage system is coupled via a network to a storage service that has one or more file servers. The storage system comprises a processor; a memory; a volume-based snapshot control module configured to create a snapshot volume of data at a certain time, the snapshot volume being a block-based volume which is divided into a plurality of portions; and a copy control module configured to read each portion of the snapshot volume and send each portion as file data to the storage service via the network, and to generate mapping information between an address of each portion in the storage system and a file identifier of the file data of each portion in the storage service.

US Patent Application No. 2010/274982 (Mehr et al.) discloses a system and a method that facilitate integration of a distributed backup environment and online backup environment. A super peer device can be designated from a set of peer devices. The super peer can distribute backup data amongst the set of peer devices based upon availability and storage capacity of the peer devices. In addition, the super peer can transfer portions of backup data from the set of peers to an online backup service.

U.S. Pat. No. 7,636,764 (Fein et al.) discloses methods and apparatus, including computer program products, for data forwarding storage. A network includes a group of interconnected computer system nodes, the group including at least one central server, wherein the at least one central server communicates with a cloud resource and controls support of the group of nodes using the cloud resource; and each node of the group of interconnected computer system nodes receives data and continuously forwards the data from node memory to node memory without storing on any physical storage device.

US Patent application No. 2003/051021 (Hirschfeld et al.) discloses a virtualized logical server cloud that enables logical servers to exist independent of physical servers that instantiate the logical servers. Servers are treated as logical resources in order to create a logical server cloud. The logical attributes of a logical server are non-deterministically allocated to physical resources creating a cloud of logical servers over the physical servers. Logical separation is facilitated by the addition of a server cloud manager, which is an automated multi-server management layer. Each logical server has persistent attributes that establish its identity. Each physical server includes or is coupled to physical resources including a network resource, a data storage resource and a processor resource. At least one physical server executes virtualization software that virtualizes physical resources for logical servers. The server cloud manager maintains status and instance information for the logical servers including persistent and non-persistent attributes that link each logical server with a physical server.

International Application No. WO/06045847 (Edwards et al.) discloses a system having a virtual overlay infrastructure mapped onto physical resources for processing, storage and network communications, the virtual infrastructure having virtual entities for processing, storage and network communications. Virtual infrastructures of different users share physical resources but are isolated and have their own management entities. An interface between infrastructures allows controlled relaxation of the isolation, using a gateway between virtual nets, or shared virtual storage devices. This can allow businesses to share data or applications, while maintaining control of security.

SUMMARY

In accordance with certain aspects of the currently presented subject matter, there is provided a storage arrangement comprising a first storage system comprising a first physical storage space constituted by a first plurality of physical storage devices controlled by one or more first storage control devices constituting a first control layer, and one or more second storage systems operatively coupled to the first storage system and each comprising a second physical storage space constituted by a second plurality of physical storage devices controlled by one or more second storage control devices constituting a second control layer.

The first control layer is operable to handle a first logical address space comprising at least one first logical group (e.g. one or more logical volumes, one or more virtual partitions, one or more snapshots, one or more combinations of a given logical volume and its respective one or more snapshots, etc.) characterized by a plurality of logical block addresses; wherein said first control layer comprises a first mapping module handling a first mapping structure associated with said at least one first logical group. Each said second control layer comprises, respectively, a second mapping module handling a second mapping structure associated with said at least one first logical group. The first mapping structure is configured to provide mapping between logical addresses related to said at least one first logical group and corresponding addresses related to the first physical address spaces, and/or to point to respective second mapping structure configured to provide mapping between logical addresses related to said at least one first logical group and corresponding addresses related to respective second physical address spaces.

The first and the second storage systems can be part of a cloud storage arrangement and/or can constitute a storage cluster.

Optionally, the first storage system can be designated as a sole storage system physically accommodating data related to said at least one first logical group, and the first mapping structure can be designated as a sole mapping structure to be modified resulting in modifications related to said at least one first logical group.

In accordance with further aspects and, optionally, in combination with other aspects of the presently disclosed subject matter, the mapping between one or more contiguous ranges of addresses related to said at least one first logical group and one or more contiguous ranges of addresses related to the corresponding physical addresses can be provided by a plurality of mapping trees; wherein each storage system is associated with its own tree assigned to said certain logical group; wherein the storage control devices of different storage systems are configured to independently handle the mapping trees associated with the respective storage systems; and wherein the leaves of each mapping tree are associated with values indicating a mapping tree responsible for mapping the range of logical addresses represented by respective leaves into physical addresses handled by respective storage system and/or indicating corresponding addresses related to physical address space of the respective storage system.

In accordance with further aspects and, optionally, in combination with other aspects of the presently disclosed subject matter, the first mapping structure can comprise at least one ordered tree data structure comprising one or more leaves and wherein a) a depth of a leaf in the tree represents a length of a contiguous range of addresses related to said at least one first logical group; b) a path followed from a tree root to the leaf indicates an offset of the respective range of addresses within said at least one first given logical group; c) a value associated with the leaf indicates an offset of respective contiguous range of addresses related to the first physical storage space and corresponding to said contiguous range of addresses related to said at least one first logical group and/or points to a respective second mapping structure handling mapping of said contiguous range of addresses related to said at least one first logical group to addresses related to respective second physical storage space.

In accordance with further aspects and, optionally, in combination with other aspects of the presently disclosed subject matter, the first storage system can be designated as a sole storage system physically accommodating data related to said at least one first logical group, and the respective first mapping tree is designated as a sole mapping tree to be modified resulting in modifications related to said at least one first logical group, and wherein mapping trees associated with all second storage systems and corresponding to said at least one first logical group are handled as degenerated trees, each one with a single leaf associated with respective value indicating said first mapping tree for mapping addresses corresponding to said at least one first logical group.

In accordance with further aspects and, optionally, in combination with other aspects of the presently disclosed subject matter, a control layer can further comprise a first virtual layer operable to represent the logical address space, said first virtual layer characterized by a plurality of virtual unit addresses (VUA), and/or further comprises a second virtual layer operable to represent the physical storage space, said second virtual layer characterized by a plurality of virtual disk addresses (VDA). Mapping between contiguous ranges of addresses related to the logical address space and contiguous ranges of addresses related to the physical address space comprises at least one of the mapping options: a) mapping between addresses characterizing the logical address space (LBA) and addresses characterizing the physical address space (DBA); b) mapping between VUA and VDA addresses; c) mapping between LBA and VDA addresses; and d) mapping between VUA and DBA addresses.

In accordance with further aspects and, optionally, in combination with other aspects of the presently disclosed subject matter there is provided a method of operating a storage arrangement comprising two or more operatively coupled storage system each comprising a respective physical storage space constituted by a plurality of physical storage devices controlled by one or more storage control devices constituting a respective control layer. The method comprises: configuring the storage arrangement to handle a logical group characterized by a plurality of logical block addresses; wherein said configuring comprises configuring in each control layer a mapping structure associated with said logical group, each mapping structure handling mapping between addresses related to said logical group and addresses related to the corresponding physical address space in respective storage system; responsive to receiving by a storage system an I/O request addressed to at least one contiguous address range comprised in said logical group, identifying among the mapping structures a mapping structure handling mapping said at least one range to corresponding addresses related to physical address space in respective storage system; mapping said at least one range into corresponding addresses using the identified mapping structure; and serving the received I/O request.

When the I/O request is a read request, said read request is served by a storage system that received the request. When the I/O request is a write request, said write request is served by a storage system corresponding to the identified mapping structure. The identified mapping structure is further updated in accordance with the served write request.

In accordance with further aspects and, optionally, in combination with other aspects of the presently disclosed subject matter, each mapping structure can be configured to provide mapping between logical addresses related to said logical group and corresponding addresses related to the physical address space of respective storage system and/or to point to another mapping structure in order to provide mapping between logical addresses related to said logical group and addresses corresponding to the logical group and related to respective another physical address spaces.

In accordance with further aspects and, optionally, in combination with other aspects of the presently disclosed subject matter each mapping structure can comprise at least one ordered tree data structure comprising one or more leaves and wherein a) a depth of a leaf in the tree represents a length of a contiguous range of addresses related to said logical group; b) a path followed from a tree root to the leaf indicates an offset of the respective range of addresses within said logical group; c) a value associated with the leaf indicates an offset of respective contiguous range of addresses related to physical storage space in respective storage system and corresponding to said contiguous range of addresses related to said logical group and/or points to another mapping structure handling mapping of said contiguous range of addresses related to said logical group to corresponding addresses related to physical storage space in respective another storage system.

Among advantages of certain embodiments of the presently disclosed subject matter is enabling transparent access to the cloud storage resources with minimized and scalable metadata required for managing the cloud storage arrangement.

BRIEF DESCRIPTION OF THE DRAWINGS

In order to understand the invention and to see how it can be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the present invention can be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "assigning", "determining", "generating", "activating", "associating", "writing", "selecting", "allocating", "storing", "managing" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, storage system and parts thereof disclosed in the present applications.

The operations in accordance with the teachings herein can be performed by a computer specially constructed for the desired purposes or by a general-purpose computer specially configured for the desired purpose by a computer program stored in a computer readable storage medium.

Embodiments of the present invention are not described with reference to any particular programming language. It will be appreciated that a variety of programming languages can be used to implement the teachings of the inventions as described herein.

The references cited in the background teach many principles of operating cloud storage that are applicable to the presently disclosed subject matter. Therefore the full contents of these publications are incorporated by reference herein where appropriate for appropriate teachings of additional or alternative details, features and/or technical background.

In the drawings and descriptions, identical reference numerals indicate those components that are common to different embodiments or configurations.

Figure 1:
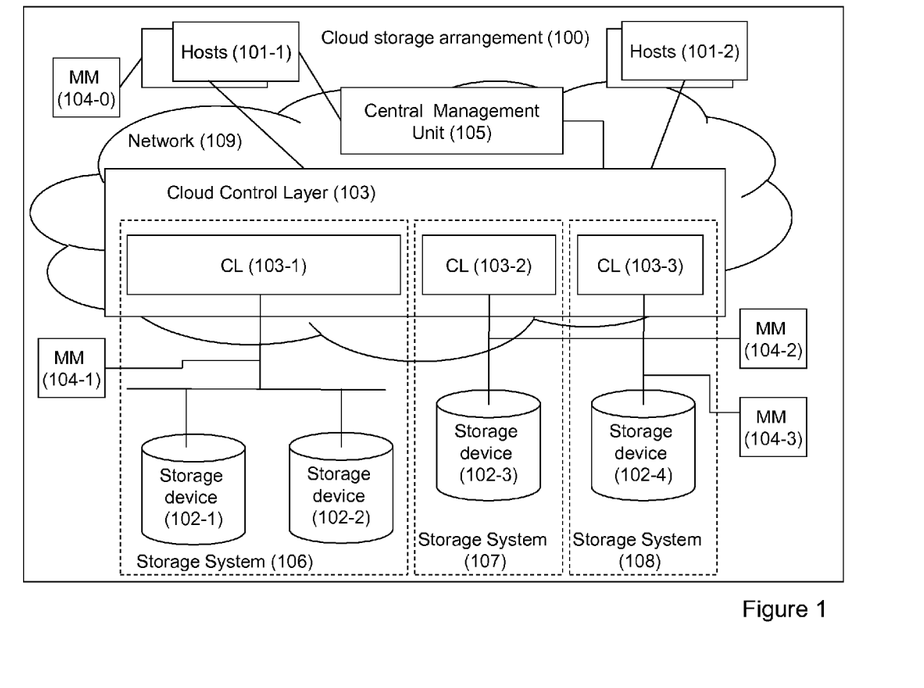
FIG. 1 illustrates a schematic functional block diagram of a cloud storage arrangement in accordance with certain embodiments of presently disclosed subject matter.

Bearing this in mind, attention is drawn to FIG. 1 illustrating an exemplary cloud storage arrangement 100 in accordance with certain embodiments of the currently presented subject matter.

The plurality of host computers (workstations, application servers, etc.) illustrated as host groups 101-1 and 101-2 are enabled to have a network access to data physically stored in one or more storage systems illustrated as 106-108. As illustrated by way of non-limiting example, storage system 106 comprises a control layer 103-1 and storage devices 102-1 and 102-2; a storage system 107 comprises a control layer 103-2 and storage device 102-3; and a storage system 108 comprises a control layer 103-3 and storage device 102-4. I/O operations related to a given storage device can be provided merely with direct control of the control layer of the respective storage system. The control layer of a given storage system can be configured to enable I/O operations with regard to the respective storage devices responsive to I/O requests received directly from the hosts and/or I/O requests or derivatives thereof received via direct or indirect communication with other storage systems. The storage systems and/or parts thereof can be located at different locations. The storage devices constitute a physical storage space distributed between multiple storage systems.

The cloud storage arrangement further comprises a cloud storage control layer 103. The cloud storage control layer is operable to control interface operations (including I/O operations) between the host computers and the parts of physical storage space available to respective hosts. The cloud storage control layer is further operable to handle a virtual representation of physical storage space. The cloud control layer can control interface operations for given hosts regardless of how the physical storage space available to these hosts is distributed over different storage systems. For example, Small Computer System Interface (SCSI) Input/Output (I/O) referral techniques can be utilized to facilitate communication between an iniftiator system and the storage resources in the cloud storage arrangement. A data requester can transmit a data request command to a first storage system of the cloud storage arrangement. If a portion of the data requested is not stored by the first storage system, but is stored by a second storage system of the cloud storage arrangement, scale-out techniques such as data forwarding can be utilized for accessing data stored by the second storage system.

The control layer functions can be implemented in hardware, software, firmware or any suitable combination thereof. The functions of a respective control layer can be provided by one or more dedicated control devices, or can be integrated (fully or partly) with one or more network devices (host computers, storage devices, communication devices enabling communication between the hosts and the storage devices, web servers, etc.). Optionally, a format of logical representation provided by the control layer can differ depending on interfacing applications.

The storage systems are managed with the help of managing modules illustrated as 104-1-104-4. The storage systems 106-108 and respective management devices constitute a part of the cloud storage arrangement 100. By way of non-limiting example, the storage systems can be managed as follows: storage system 106 can be managed with the help of management module 104-1 located at a user side and/or management module 104-2 located at a physical storage side (and, optionally, possessed by a third party service provider); management module 104-3 manages the storage system 107, and management module 104-4 manages the storage system 108. The management modules (MMs) are adapted to perform at least the management commands that are standard in the industry: create volume, delete volume, snapshots, etc.

The MMs managing different storage systems can be configured to intercommunicate with each other. Optionally, the MMs can be operatively connected to one or more centralized management unit(s) 105 communicating with respective MMs. The centralized management unit (CMU) can be implemented in a single server. Alternatively, it can operate in a distributed manner in more than one server at a time and/or can be implemented as a web-based application. Storage administrator(s) can provide storage management commands via the CMU and/or respective MMs. The centralized management unit can be a part of the cloud storage control layer 103 or can be an external entity operatively connected to the cloud control layer.

The physical storage space can be implemented using any appropriate permanent storage medium, including, by way of non-limiting example, one or more Solid State Disk (SSD) drives, Hard Disk Drives (HDD) and/or one or more disk units (DUs), comprising several disks. The storage control layer and the storage devices can communicate with the host computers and within the storage system in accordance with any appropriate storage protocol.

Typically, the stored data are represented to a client in terms of logical objects. Depending on storage protocol, the logical objects can be logical volumes, data files, image files, etc. For purpose of illustration only, the following description is provided with respect to logical objects represented by logical volumes. Those skilled in the art will readily appreciate that the teachings of the present invention are applicable in a similar manner to other logical objects.

A logical volume or logical unit (LU) is a virtual entity logically presented to a client as a single virtual storage device. The logical volume represents a plurality of data blocks characterized by successive Logical Block Addresses (LBA) ranging from 0 to a number LUK. Different LUs can comprise different numbers of data blocks, while the data blocks are typically of equal size (e.g. 512 bytes). Blocks with successive LBAs can be grouped into portions that act as basic units for data handling and organization within the system. Thus, for instance, whenever space has to be allocated on a disk or on a memory component in order to store data, this allocation can be done in terms of data portions also referred to hereinafter as "allocation units". Data portions are typically of equal size throughout the system (by way of non-limiting example, the size of data portion can be 64 Kbytes). For purpose of illustration only, the operation of the storage system is described herein in terms of entire data portions. Those skilled in the art will readily appreciate that the teachings of the present invention are applicable in a similar manner to partial data portions.

In case of cloud storage arrangement, the physical storage space corresponding to a logical volume can reside over several storage systems, while the exact way in which this volume is internally defined and handled within the cluster can be transparent to the host. Once the storage administrator has defined a volume for a client, the client (user, application, etc.) can issue I/O requests to the storage, and the cloud storage control layer will handle the request properly.

The cloud storage control layer is operable to handle a logical address space characterized by a plurality of logical block addresses (LBAs) and available to said plurality of hosts. The cloud storage control layer is further operable to provide mapping between one or more contiguous ranges of addresses related to the logical address space and one or more contiguous ranges of addresses related to the physical address space.

As will be further detailed with reference to FIGS. 2-3, when receiving a write request from a host, the cloud storage control layer defines a physical location(s) designated for writing the respective data (e.g. in accordance with an allocation scheme, preconfigured rules and policies stored in the allocation module(s) or otherwise) and further processes the request accordingly. When receiving a read request from the host, the cloud storage control layer defines the physical location(s) of the desired data and further processes the request accordingly. Similarly, the cloud storage control layer can issue updates related to a given data object to all storage nodes which physically store data related to the data object. The cloud storage control layer is further operable to redirect the request/update to storage device(s) with appropriate storage location(s) irrespective of the specific storage control device receiving I/O request.

For purpose of illustration only, the following description is made with respect to management provided with the help of a centralized management unit implemented as a web-based application managed by a storage administrator. It should be noted that the teachings of the present invention are not bound by such management, and are applicable in a similar manner to a variety of other possible management implementations, including several administrators, each responsible for a respective part of the entire storage space.

The administrator can define a logical volume in the cloud storage arrangement (cloud-wide volume) with the help of the CMU 105. CMU communicates with MMs 104-1-104-3 and requires respective configuring of the new volume and its properties (size, access privileges, snapshot, etc.). The volume is defined by a name that is unique in the cloud arrangement. MM defines the volume in its respective storage system by adding an entry to the volume definition table (with all properties). The volume is considered as created upon acknowledgement by all MMs. Thus, defining a volume is a cloud-wide operation and it is completed only after all respective storage systems have acknowledged its local completion. This is similar in the case for other management operations (e.g. deleting a volume, etc.). The above process of definition and acknowledgement of a new volume can include all MM in the cloud storage arrangement or only MMs related to the storage systems comprising physical storage resources available to the volume.

The presented subject matter is not bound by the specific architecture illustrated with reference to FIG. 1, equivalent and/or modified functionality can be consolidated or divided in another manner and can be implemented in any appropriate combination of software, firmware and hardware. Likewise, the teachings of the presented subject matter are applicable to a storage cluster.

Figure 2:
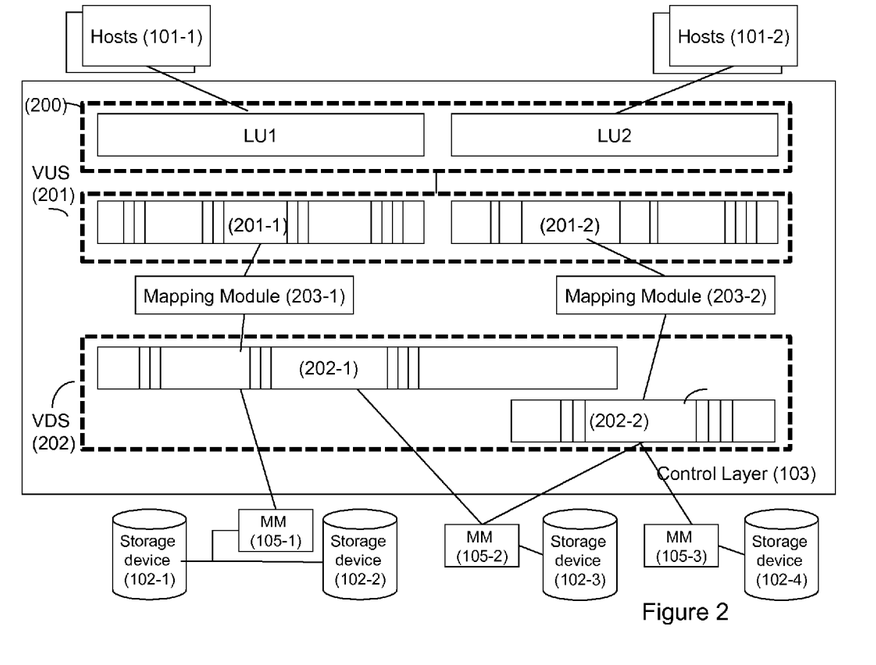
FIG. 2 illustrates a schematic functional block diagram of a cloud storage control layer configured in accordance with certain embodiments of the presently disclosed subject matter.

Referring to FIG. 2, there is illustrated a schematic functional diagram of a cloud storage control layer configured in accordance with certain embodiments of the presently disclosed subject matter.

The cloud storage control layer 103 comprises independently operating control layers (not shown) of respective storage systems 106-108 comprised in the cloud storage arrangement. Control of I/O operations on a storage device comprised in a given storage system is provided merely via the control layer of this given storage system. The control layers of different storage systems are operationally coupled, directly and/or via one or more control devices (not shown) dedicated for centralization of control functions. The cloud control layer can further comprise additional centralized functional modules (e.g. long-term cache in addition to cache memories in the storage systems, centralized additional non-volatile memory, etc.).

Optionally, control layer of each storage system in the cloud arrangement can comprise interconnected first and second virtual layers detailed, for example, in the International application WO2010/092576 assigned to the assignee of the present application and incorporated herein by reference in its entirety.

Likewise, in accordance with certain embodiments of the presently disclosed subject matter, the virtual presentation of the physical storage space of the cloud storage arrangement can be provided through creation and management of at least two interconnected virtualization layers: a first virtual layer operative to represent logical units available in the cloud storage arrangements to the clients (workstations, applications servers, etc.) and a second virtual layer operative to represent the physical storage space available to the respective clients. The first virtual layer is characterized by a Virtual Unit Space (VUS). The logical units are represented in VUS as virtual data blocks characterized by virtual unit addresses (VUAs). The second virtual layer is characterized by a Virtual Disk Space (VDS). The virtual data blocks are represented in VDS with the help of virtual disk addresses (VDAs). Virtual disk addresses are substantially statically mapped into addresses in the physical storage space. This static mapping can be changed responsive to modifications of physical configuration of the storage system (e.g. by disk failure or disk addition).

One or more LUs are mapped into the VUS. In a typical case, initially the storage system assigns to a LU contiguous LBAs addresses and, respectively, continuous VDA addresses. However, existing LUs can be enlarged, reduced or deleted, and some new ones can be defined during the lifetime of the system. Accordingly, the range of contiguous data blocks associated with the LU can correspond to non-contiguous data blocks assigned in the VDS and/or physical address space. The parameters defining the request in terms of LUs are translated into parameters defining the request in the VUAs, and parameters defining the request in terms of VUAs are further translated into parameters defining the request in the VDS in terms of VDAs and further translated into physical storage addresses in terms of disk block addresses (DBA).

Translating LBA addresses of data blocks in LUs into addresses (VUAs) in VUS can be provided independently from translating addresses virtual disk addresses (VDA) in VDS into the physical storage addresses (DBA). Such translation can be provided, by way of non-limited example, with the help of an independently managed VUS allocation table and a VDS allocation table associated with the respective spaces or parts thereof. Different blocks in VUS can be associated with one and the same block in VDS, while allocation of physical storage space can be provided only responsive to destaging respective data from the cache memory to the disks (e.g. for snapshots, thin volumes, etc.).

As illustrated in FIG. 2, the cloud control layer 103 comprises logical address space 200 constituted by two cloud-wide defined logical volumes LU1 and LU2. The control layer can further comprise the first virtual layer 201 interfacing with the logical address space, and the second virtual layer 202 interfacing with the physical storage space. The VUS of the first virtual layer 201 can be constituted as non-overlapping range of respective VUS addresses of all storage systems in the storage cloud arrangement or can be otherwise configured to represent logical units available in the cloud. For convenience, addresses in the VUS can be assigned separately for each logical volume and/or volumes group.

By way of non-limiting example, the illustrated virtual unit space 201 corresponds to the logical address space 200; non-overlapping ranges of virtual unit addresses illustrated as 202-1 and 202-2 correspond, respectively, to cloud-wide defined logical volumes LU1 and LU2. The second virtual layer 202 provides virtual representation of physical storage spaces available to the clients in the storage cloud arrangement. As illustrated in FIG. 2, the second virtual layer 202 can be constituted as a set of possibly overlapping ranges of VDS addresses, each such range (illustrated as 202-1 and 202-2) virtually representing cloud physical storage space available to a certain logical unit. Range 202-1 virtually represents physical storage space available to logical volume LU1 in storage systems 106 and 107. Range 202-2 virtually represents physical storage space available to logical volume LU2 in storage systems 107 and 108.

Alternatively, the second virtual layer 202 can be constituted as a non-overlapping range of VDS addresses of all storage systems in the storage cloud, or in another appropriate way.

The first virtual layer 201 and the second virtual layer 202 are interconnected, and addresses in VUS can be dynamically mapped into addresses in VDS. Mapping between VUS and VDS addresses (referred to hereinafter also as Virtual Address Mapping) can be provided with the help of one or more mapping modules. As illustrated, the VUS addresses in the range 202-1 corresponding to the logical volume LU1 are translated to respective range of VDS addresses 202-1 with the help of a mapping module 203-1. Likewise, the VUS addresses in the range 202-2 corresponding to the logical volume LU2 are translated to the respective range of VDS addresses 202-2 with the help of a mapping module 203-2. In the illustrated example, each range of VUS addresses (i.e. accordingly, each logical volume) is associated with a dedicated mapping module configured to provide necessary mapping between the VUS range and the respective range of VDS addresses. A given storage system in the cloud storage arrangement comprises a mapping module responsible for the mapping between VUS and VDS addresses in the given storage system. The functions of a dedicated mapping module associated with a given logical unit can be provided by operationally connected (directly or indirectly) mapping modules of storage systems corresponding to physical addresses available to the given logical volumes.

Thus, the cloud storage control layer is operable to provide mapping between addresses related to logical address space and addresses related to physical storage space. The mapping can include mapping between LBA and DBA addresses, mapping between VUA and VDA addresses, mapping between LBA and VDA addresses, and/or mapping between VUA and DBA addresses. The mapping can be provided with the help of a mapping tree(s). The mapping trees can be further associated with one or more allocation tables indicating allocated and free addresses in the physical storage space. Mapping trees and respective allocation tables can be handled in the respective mapping modules. By way of non-limiting example, mapping between addresses related to logical address space and addresses related to physical storage space with the help of mapping trees within a single storage system is detailed in US application US2011/0082997, filed Oct. 4, 2010, assigned to the assignee of the present application and incorporated herein by reference in its entirety.

In accordance with certain embodiments of the presently disclosed subject matter, each logical group (e.g. a logical volume, a group of logical volumes, a virtual partition, a combination of a logical volume and its respective snapshot (s), etc.) is associated with at least one mapping structure (e.g. mapping tree) dedicated to the group.

The mapping structure can be configured as an ordered tree data structure comprising one or more leaves wherein a) a depth of a given leaf in the tree is indicative of a length of a contiguous range of addresses corresponding to a given logical group and related to logical address space; b) a path followed from a tree root to the leaf is indicative of an offset of the respective range of addresses related to logical address space within the given logical group; c) a value associated with the leaf is indicative of an offset of respective contiguous range of addresses related to the physical storage space and corresponding to said contiguous range of addresses corresponding to said given logical group and related to logical address space or a value indicating a storage system and/or another mapping tree handling a contiguous range of addresses related to this physical storage space.

The depth of a given leaf can be configured in inverse relation to the length of respective contiguous range of addresses related to the respective logical group. A sequential number of a given leaf node can be calculated as D−1, wherein D is equal to a maximal admissible number of addresses related to the physical storage space divided by a number of contiguous addresses in the range of addresses related to the logical group.

By way of non-limiting example, the path followed from a tree root to the leaf can be represented as a string of zeros and ones depending on right and/or left branches comprised in the path. The offset of the respective range of addresses within the given logical group can be calculated in accordance with the path followed from the tree root to the leaf with the help of the following expression:

$$\sum_{i=0}^{d-1} r_i \cdot 2^{(M-i-1)}$$

where M is the power of two in the maximal number of admissible addresses in the given logical group, d is the depth of the leaf, i=0, 1, 2, 3, d−1 are the successive nodes in the tree leading to the leaf, and $r_i$ is a value equal to zero for one-side branching and equal to one for another side branching.

Updating the mapping trees is provided responsive to predefined events (e.g. receiving a write request, allocation of VDA address, destaging respective data from a cache, physical writing the data to the disk, etc.).

For purpose of illustration only, the following description is provided with respect to logical volumes. Likewise, the presented teachings are applicable in a similar manner to other logical groups. Yet, for purpose of illustration only, the following description is provided with respect to mapping structure configured as a mapping tree. Likewise, other mapping structures capable to provide necessary mapping in accordance with the presented teachings can be use for translation between addresses related to logical address space and addresses related to physical storage space.

For purpose of illustration only, the following description is provided with respect to using one or more mapping trees in a single mapping operation between addresses related to logical address space and addresses related to physical address space (e.g. mapping between LBA and DBA addresses or mapping between VUA and VDA addresses). Likewise, mapping trees can be used for multiple-mapping operations (e.g. mapping between LBA and VDA addresses with further mapping between VDA and DBA addresses). The teachings of the presently disclosed subject matter are, likewise applicable to each of such multiple-mapping operations.

In accordance with certain embodiments of the currently presented subject matter, when creating a new volume in the cloud storage arrangement, the central management unit and/or respective MMs generate one or more mapping trees configured to enable mapping between the newly created volume and physical addresses available to the volume. The mapping tree(s) can be configured as mapping trie(s) enabling mapping between logical and physical addresses corresponding to the volume (for example, addresses in the first (VUS) and second (VDS) virtual layers comprised in the cloud control layer). If the mapping tries corresponding to different logical volumes have overlapping VDS addresses, mapping with the help of respective tries shall be coordinated in any appropriate manner (e.g. with the help of the centralized management unit).

In certain embodiments of the presently disclosed subject matter, required mapping between one or more contiguous ranges of logical addresses related to a given cloud-wide logical volume logical volume and one or more contiguous ranges of addresses related to the respective available physical address space can be provided by a single tree, wherein the physical addresses can be distributed over at least two storage systems. The leaves of the mapping tree can be associated with values indicating storage systems handling respective physical addresses.

Alternatively, all storage systems comprised in the cloud can be associated each with a separate tree related to a certain volume, such trees being configured in all storage systems when creating this certain volume. Thus, the cloud-wide logical volume can be associated with a plurality of mapping trees corresponding to the storage systems comprising physical storage space available to the volume. Each mapping tree can comprise at least one leaf with an associated value indicating a storage system and/or another mapping tree handling a contiguous range of addresses related to the physical storage space corresponding to the contiguous range of addresses related to the logical address space represented by the leaf.

For purpose of illustration only, in the following description each storage system in the cloud storage is associated with a separate mapping tree enabling mapping between the volume and respective physical resources. Those skilled in the art will readily appreciate that the teachings of the presently disclosed subject matter are applicable in a similar manner to other suitable embodiments of mapping trees.

By way of non-limiting example, upon creation, logical volume LU1 can be associated with three mapping trees corresponding to the storage systems 106, 107 and 108, namely, mapping tree MT1(LU1) configured for mapping between the logical addresses of volume LU1 and physical resources of the storage system 106, mapping tree MT2(LU1) configured for mapping between the logical addresses of volume LU1 and physical resources of the storage system 107, and mapping tree MT3(LU1) configured for mapping between the logical addresses of volume LU1 and physical resources of the storage system 108. In the non-limiting example illustrated in FIG. 2, only storage systems 106 and 107 comprise physical resources available to the volume LU1. All three mapping trees comprise leaves corresponding to logical addresses in the volume. If a certain contiguous range L of addresses related to the logical address space corresponds to contiguous ranges P of addresses related to the physical storage space of the storage system 106, the mapping tree MT1(LU1) will provide the required mapping between the ranges L and P; and a value associated with the respective leaf will be indicative of an offset of range P. A leaf corresponding to range L in the mapping tree MT2(LU1) and a leaf corresponding to this range in the mapping tree MT3(LU1) will be associated with values indicating that the mapping for the range L is provided by the tree MT1(LU1). Optionally, another logical range $L_1$ can be handled by a different mapping tree (e.g. MT2(LU1)), while the respective leaves in the rest of the mapping trees associated with the volume will be associated with values indicating that the mapping for the range $L_1$ is provided by the tree MT2(LU1).

It should be noted that at the time of creation, and before any I/O activity starts towards the volume LU1, MT1(LU1), MT2(LU1) and MT3(LU1) are degenerated tries containing only the root.

Optionally, the architecture of the cloud storage arrangement illustrated with reference to FIGS. 1-2 can be simplified and at the time of creating LU1 (or, alternatively, responsive to a first write request corresponding to LU1), the CMU can designate one of the storage systems as a sole storage system comprising physical storage resources corresponding to the newly created volume (e.g. the storage system 106 can be configured as a sole storage system accommodating data related to the volume LU1). Accordingly, the mapping tree MT1(LU1) will be the sole mapping tree modified (and, accordingly, growing) resulting to write requests related to the logical volume LU1, while the trees MT2(LU1) and MT3(LU1) will remain degenerated trees, each one with a single leaf associated with respective value indicating MT1(LU1) as a tree handling the mapping of the entire volume LU1. The cloud storage arrangement can be further simplified by independently operating the control layers of each storage system.

Figure 3:
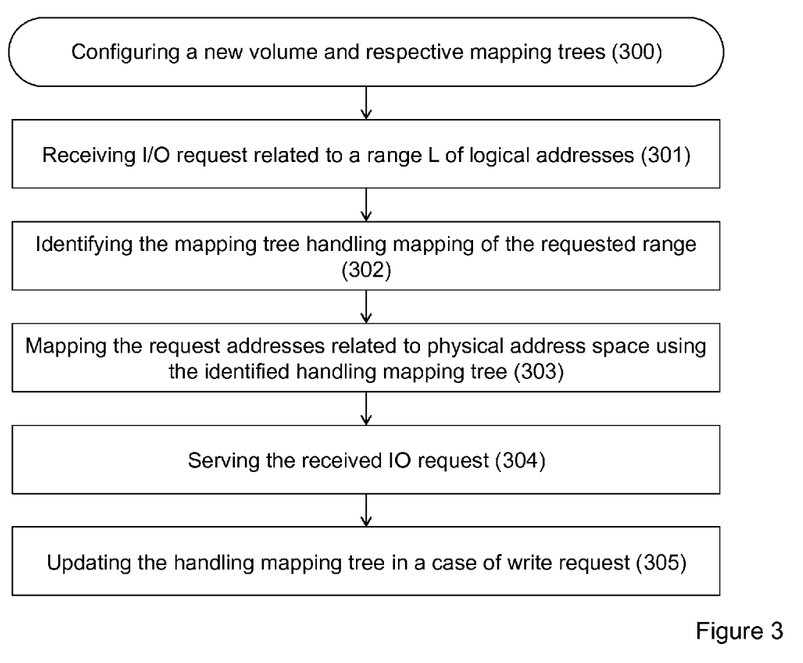
FIG. 3 illustrates a schematic flow diagram of I/O operation in accordance with certain embodiments of the presently disclosed subject matter.

Referring to FIG. 3, there is illustrated a generalized flow diagram of I/O operation in accordance with certain embodiments of the presently disclosed subject matter. Once a volume has been defined (300) and respective mapping trees have been associated with each storage system in the cloud storage arrangement, I/O activity between the host and the storage cloud arrangement can start. A storage system that receives I/O requests will use the mapping tree related to a respective volume to translate addresses related to logical address space into addresses related to physical address space. As was detailed with reference to FIGS. 1-2, the storage systems are configured to implement protocols supporting necessary interaction between the storage systems.

Responsive to a received (301) I/O request addressed to a given logical range, the cloud control layer indentifies (302) the volume and the corresponding mapping tree handling mapping of the requested range. Optionally the cloud control layer can identify all mapping trees related to the requested range (i.e. associated with the respective volume), and search for the handling tree among them. Alternatively, the cloud control layer can search for at least one mapping tree associated with the respective volume, this tree comprising a leaf corresponding to the requested range. A leaf in this tree will point either to the requested physical addresses (in case the tree is the handling mapping tree) or to the respective handling mapping tree. The identified handling mapping tree is used for mapping (303) the request into physical addresses (e.g. in a manner detailed in the US application US2011/0082997), retrieving the requested data and serving (304) the request accordingly. The read request will be served by the storage system which received the request, while the write request will be served by the storage system corresponding to the handling mapping tree. The write acknowledgement is generated by the storage system handling the mapping tree and send to the host directly or via the receiving system. The handling mapping tree is further updated (305) in a case of write I/O request.

In the described above simplified case of a single storage system designated for accommodating physical resources corresponding to a given volume, a read request can be received either by this designated storage system or by another storage system. If a read request received by the designated storage system, it can be handled in a way detailed in the US application US2011/0082997, i.e. the mapping tree associated with the designated storage system can be used for defining physical addresses corresponding to the requested range(s), and respective data can be retrieved accordingly. In case a read request is received by another storage system associated with degenerated mapping tree corresponding to the given volume, this degenerated tree will point to the mapping tree associated with the designated storing system and handling the mapping of the request related to the given volume. Accordingly, said another storage system will redirect the read request to the designated storage system. The designated storage system will use the associated mapping tree for retrieving the requested data, and send the data to the other storage system that received the request. This other storage system further handles the read request in accordance with the requested data received from the designated storage system.

If a write request received by the designated storage system, the mapping tree associated with the designated storage system can be used for handling the write request (i.e. in a way detailed in the US application US2011/0082997). In case a write request is received by another storage system associated with degenerated mapping tree corresponding to the given volume, this degenerated tree will point to the mapping tree associated with the designated storing system and handling the mapping of the request related to the given volume. Accordingly, said another storage system will redirect the write request to the designated storage system. The designated storage system will use the associated mapping tree for handling the write request and will update the mapping tree accordingly.

The embodiments detailed with reference to FIGS. 1-3 enable adding a new storage system to a cloud at any point in time in an effective manner. Before being added to the cloud storage arrangement, the new storage system shall be configured to comprise information about all volumes currently defined in the arrangement. Such configuration can be provided by the CMU, by communication of the new storage systems with the other storage systems in the cloud arrangement, or by other appropriate way. Further, the new storage system is configured to comprise degenerated trees corresponding to each of the volumes. Once the new storage system is configured as above, it can be added to the cloud storage arrangement; and, gradually, it will start to be owner of new or of existing volumes in the cloud.

Likewise, a storage system can be removed from the cloud. In case of gentle removal, there is a gradual process of migrating ownership from the storage system to be removed, to other storage system. In case of forced removal, data may be lost, unless there is a mirroring situation as described below.

Likewise, the embodiments disclosed in the present application can be also used as part of a migration process. The migration can be also provided for individual volumes inside the cloud, from one to another designated storage system (e.g. for purposes of load balancing, geographical proximity (for downloads, for example), security, and the like).

Optionally, in certain embodiments of the presently disclosed subject matter, each data portion be can stored more than once, while each copy can be stored in separate storage systems. In this way, data is protected as in a mirrored system, while copies of data reside in different storage systems. In writes, all copies must be updated. In reads, there can be alternative policies specifying from where the data will be read: (1) always from one and the same storage systems; (2) from different storage systems according to addresses (say, via modulo); (3) dynamically choosing the storage system according to current performance parameters; etc.

Optionally, in certain embodiments of the presently disclosed subject matter, the data corresponding to a certain volume can be stored in two storage systems—a local storage system and a storage system designated in the cloud. The distribution of data between two systems can depend on free space in the storage systems, access patterns, current performance parameters, network traffic, etc. In this case the tries will grow in both storage systems. Whenever a certain range is written to a local storage system, it is necessary to update the tree of the respective storage system in the cloud, indicate that any data corresponding to the range are obsolete and indicate that data shall be read with the help of the local mapping trie. Conversely, the local storage system shall be updated whenever a certain range is written to the storage system in the cloud. In this way, any new read request directed at the range will be correctly redirected to the storage system where it is now stored.

In the above embodiment, preferred writing to a local storage system can be for few-writes many-reads patterns, for patterns where certain ranges of addresses are repeatedly written, etc. By way of non-limiting example, the solution can provide certain advantages for Internet providers and the like.

It should be noted that the above described storage system and method of operating thereof can be used in the framework of SAN, NAS, or any other kind of data storage approach.

It is to be understood that the subject matter is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present invention.

It will also be understood that the system according to the invention can be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the claims associated with the present invention.

The invention claimed is:

1. A system comprising a first storage system that comprises: a first physical storage space that includes a first plurality of physical storage devices, and a first control layer that includes one or more first storage control devices, and wherein one or more second storage systems are operatively coupled to the first storage system and each includes: a second physical storage space that includes a second plurality of physical storage devices, and a second control layer that includes second storage control devices;

wherein the first control layer is configured to provide access to a first logical group characterized by a plurality of logical block addresses;

wherein said first control layer includes a first mapping structure, wherein the first mapping structure is a data structure for mapping the plurality of logical block addresses of said first logical group into first values indicative of physical addresses;

wherein said second control layer includes a second mapping structure, wherein the second mapping structure is a data structure for mapping the plurality of logical block addresses of said first logical group into second values indicative of physical addresses, wherein at least one of the second values is a physical address within the second physical storage space; and wherein the first mapping structure is configured to provide translation between logical addresses within said first logical group and the values indicative of physical addresses, wherein each of the values indicative of physical addresses includes a value selected from: a physical address within the first physical storage space, and a value that points to the second mapping structure; wherein at least one logical address within the first logical group is mapped by the first mapping structure into a certain value that points to the second mapping structure;

wherein in response to receiving, by the first storage system, an I/O request addressed to a requested logical address included in said first logical group, the first storage system is configured to translate the requested logical address into a certain value indicative of physical addresses, by using the first mapping structure;

in a case where the certain value includes a first physical address range included within the first physical storage space, the first storage system is configured to serve the I/O request with data stored in the first physical address range; and in a case where the certain value includes a value that points to the second mapping structure, the first storage system is configured to serve the I/O request with data stored in a second physical address range included in the second physical storage space, wherein the second physical address range is provided by using the second mapping structure for translating the requested logical address into the second physical address range;

wherein the first control layer further comprises a first virtual layer operable to represent a logical address space that comprises the plurality of logical block addresses of the first logical group, said first virtual layer characterized by a plurality of virtual unit addresses (VUA), and wherein the first control layer further comprises a second virtual layer operable to represent the first physical storage space, said second virtual layer characterized by a plurality of virtual disk addresses (VDA), and wherein the first mapping structure is configured to provide at least one of mapping option selected from a group consisting of: a) mapping between the plurality of logical block addresses and addresses within the first physical storage space; b) mapping between VUA and VDA addresses; c) mapping between the plurality of logical block addresses and VDA addresses; and d) mapping between VUA and addresses within the first physical storage space.

2. The system of claim 1, wherein the first logical group is selected from a group consisting of one or more logical volumes, one or more virtual partitions, one or more snapshots, one or more combinations of a given logical volume and its respective one or more snapshots.

3. The system of claim 1, wherein the first mapping structure is a mapping tree;
wherein a plurality of leaves of the first mapping tree represent the plurality of logical addresses within the first logical group and comprise the values indicative of physical addresses, wherein at least part of the plurality of leaves comprise an indication of a certain second mapping tree responsible for translating logical addresses represented by the at least part of the plurality of leaves into various physical addresses handled by a second storage system of the one or more second storage systems.

4. The system of claim 1, wherein the first mapping structure comprises a first ordered tree data structure comprising one or more leaves and wherein a) a depth of a leaf in the first ordered tree data structure represents a length of a contiguous range of addresses within said first logical group; b) a path followed from a tree root to the leaf indicates an offset of the contiguous range of addresses within said first logical group; c) a value associated with the leaf indicates either: (i) an offset of contiguous range of physical addresses within the first physical storage space and corresponding to said contiguous range of addresses within said first logical group; or (ii) a value that points to a respective second mapping structure handling mapping of said contiguous range of addresses related to said first logical group into addresses related to a respective second physical storage space.

5. The system of claim 4,
wherein a certain second mapping structure comprised in a certain second storage system of the one or more storage systems is configured as a second ordered tree data structure that comprises a single leaf representing the plurality of logical block addresses of said first logical group, wherein the single leaf comprises a value indicating said first ordered tree data structure for mapping all the plurality of logical block addresses corresponding to said first logical group.

6. The system of claim 1, wherein the first and the second storage systems are part of a cloud storage arrangement.

7. The system of claim 1, wherein the first and the second storage systems constitute a storage cluster.

8. A method of operating a system that includes a first storage system operatively coupled to a second storage system, each includes a physical storage space constituted by a plurality of physical storage devices, the method comprising:
configuring a first mapping structure, wherein the first mapping structure is a data structure for mapping a plurality of logical block addresses of a logical group into first values indicative of physical addresses, wherein each of the values indicative of physical addresses includes a value selected from: a physical address within the first storage system and a value that points to a second mapping structure included in the second storage system; wherein at least one logical address within the first logical group is mapped by the first mapping structure into a certain value that points to the second mapping structure;

responsive to receiving by the first storage system an I/O request addressed to a requested logical address included in said logical group, translating the requested logical address into a certain value indicative of a certain physical address, by using the first mapping structure;

in a case where the certain value includes a first physical address range included within the first storage system, serving, by the first storage system, the I/O request with data stored in the first physical address range; and in a case where the certain value includes a value that points to the second mapping structure included in the second storage system, using the second mapping structure for translating the requested logical address into a second physical address range included in the second storage system; and serving the I/O request by the first storage system with data stored in the second physical address range;

wherein the first storage system further comprises a first virtual layer operable to represent a logical address space that comprises the plurality of logical block addresses of the logical group, said first virtual layer characterized by a plurality of virtual unit addresses (VUA), and wherein the first storage system further comprises a second virtual layer operable to represent the physical storage space, said second virtual layer characterized by a plurality of virtual disk addresses (VDA), and wherein the first mapping structure is configured to provide mapping options selected from a group consisting of: a) mapping between the plurality of logical block addresses and addresses within the physical storage space (DBA); b) mapping between VUA and VDA addresses; c) mapping between the plurality of logical block addresses and VDA addresses; and d) mapping between VUA and addresses within the first physical storage space.

9. The method of claim 8, wherein the I/O request is a read request, and wherein said read request is served by the first storage system.

10. The method of claim 8, wherein the I/O request is a write request, and wherein said write request is served by the second storage system.

11. The method of claim 10 further comprising updating the second mapping structure in accordance with the write request being served.

12. The method of claim 8, wherein the logical group is selected from a group consisting of: one or more logical volumes, one or more virtual partitions, one or more snapshots, one or more combinations of a given logical volume and its respective one or more snapshots.

13. The method of claim 8, wherein the first mapping structure comprises a first ordered tree data structure comprising one or more leaves and wherein a) a depth of a leaf in the first ordered tree data structure represents a length of a contiguous range of addresses within said logical group; b) a path followed from a tree root to the leaf indicates an offset of the contiguous range of addresses within said logical group; c) a value associated with the leaf indicates either: (i) an offset of contiguous range of physical addresses within the first storage system and corresponding to said contiguous range of addresses related to said logical group, and (ii) a value that points to the second mapping structure handling mapping of said contiguous range of addresses related to said logical group into corresponding physical addresses within the second storage system.

14. The method of claim 13, wherein a certain second mapping structure comprised in a certain second storage system of the one or more storage systems is configured as a second ordered tree data structure that comprises a single leaf representing the plurality of logical block addresses of said first logical group, wherein the single leaf comprises a value indicating said first ordered tree data structure for mapping all the plurality of logical block addresses corresponding to said logical group.

15. A non-transitory computer readable storage medium comprising computer readable program code embodied therein for operating a first storage system, wherein the computer readable program code to cause the first storage system to:

configuring a first mapping structure for mapping a plurality of logical block addresses of a logical group into values indicative of physical addresses, wherein each of the values indicative of physical addresses includes a value selected from: a physical address within the first storage system and a value that points to a second mapping structure included in a second storage system that is coupled to the first storage system; wherein at least one logical address within the first logical group is mapped by the first mapping structure into a certain value that points to the second mapping structure;

responsive to receiving by the first storage system an I/O request addressed to a requested address included in said logical group, translating the requested logical address into a certain value indicative of a certain physical address, by using the first mapping structure;

in a case where the certain value includes a first physical address range included within the first storage system, serving, by the first storage system, the I/O request with data stored in the first physical address range; and in a case where the certain value includes a value that points to the second mapping structure included in the second storage system, serving, by the first storage system, the I/O request with data stored in a second physical address range included in the second storage system, wherein the second physical address range is provided by using the second mapping structure for translating the requested logical address into the second physical address range;

wherein the first storage system further comprises a first virtual layer operable to represent a logical address space that comprises the plurality of logical block addresses of the logical group, said first virtual layer characterized by a plurality of virtual unit addresses (VUA), and wherein the first storage system further comprises a second virtual layer operable to represent the physical storage space, said second virtual layer characterized by a plurality of virtual disk addresses (VDA), and wherein the first mapping structure is configured to provide mapping options selected from a group consisting of: a) mapping between the plurality of logical block addresses and addresses within the physical storage space (DBA); b) mapping between VUA and VDA addresses; c) mapping between the plurality of logical block addresses and VDA addresses; and d) mapping between VUA and addresses within the first physical storage space.

* * * * *